US 9,940,835 B2

(12) United States Patent
Cuomo et al.

(10) Patent No.: US 9,940,835 B2
(45) Date of Patent: *Apr. 10, 2018

(54) DYNAMICALLY ROUTING MESSAGES IN A PUBLISH/SUBSCRIBE SYSTEM BY CREATING TEMPORAL TOPICS FOR SUBSCRIPTIONS AND PUBLICATIONS

(71) Applicant: International Business Machines Corporation, Armonk, NY (US)

(72) Inventors: Gennaro A. Cuomo, Durham, NC (US); Gari R. Singh, Wilmington, MA (US); Meeta Yadav, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 870 days.

This patent is subject to a terminal disclaimer.

(21) Appl. No.: 14/156,581

(22) Filed: Jan. 16, 2014

(65) Prior Publication Data

US 2015/0200877 A1 Jul. 16, 2015

(51) Int. Cl.
*G06F 15/16* (2006.01)
*G08G 1/0967* (2006.01)
(Continued)

(52) U.S. Cl.
CPC ... *G08G 1/096775* (2013.01); *G06F 17/3087* (2013.01); *G08G 1/012* (2013.01);
(Continued)

(58) Field of Classification Search
CPC ................................................ G08G 1/096775
(Continued)

(56) References Cited

U.S. PATENT DOCUMENTS 9,147,202 B1* 9/2015 Muse ................. G06Q 30/0277
2004/0128295 A1* 7/2004 Adi ........................ G06Q 40/04
(Continued)

OTHER PUBLICATIONS

Waze, "Waze—GPS, Maps & Traffic," https://play.google.com/store/apps/details?id=com.waze&hl=en, 2017, pp. 1-3.
(Continued)

*Primary Examiner* — Hamza Algibhah
(74) *Attorney, Agent, or Firm* — Robert A. Voigt, Jr.; Winstead, P.C.

(57) ABSTRACT

A method, system and computer program product for dynamically routing messages in a publish/subscribe system. A messaging application receives messages from sensors (e.g., road condition sensors). Upon analyzing the messages using data analytics, an event (e.g., icy road condition) may be correlated with the analyzed messages. In such a scenario, a temporal topic based on the triggered event is created. Furthermore, a temporal publication (e.g., "icy road condition near exit 40") and a temporal subscription are created. Potential subscribers to be associated with the temporal subscription are identified by using either geo-location information or social media information. Once those subscribers are identified, they are associated with the temporal subscription. The temporal publication is then published to the subscribers associated with the temporal subscription. In this manner, messages are dynamically routed to the appropriate subscribers that may have previously been excluded based on dynamically created temporal topics, subscriptions and publications.

18 Claims, 4 Drawing Sheets

(51) Int. Cl.
*H04L 12/58* (2006.01)
*G06F 17/30* (2006.01)
*G08G 1/01* (2006.01)
*H04W 4/04* (2009.01)
*H04W 4/20* (2018.01)

(52) U.S. Cl.
CPC ......... *G08G 1/0116* (2013.01); *G08G 1/0133* (2013.01); *G08G 1/0141* (2013.01); *G08G 1/096716* (2013.01); *G08G 1/096741* (2013.01); *H04L 51/04* (2013.01); *H04L 51/14* (2013.01); *H04L 51/20* (2013.01); *H04L 51/32* (2013.01); *H04W 4/046* (2013.01); *H04W 4/206* (2013.01)

(58) Field of Classification Search
USPC ......................................................... 709/209
See application file for complete search history.

(56) References Cited

U.S. PATENT DOCUMENTS

| | | | |
|---|---|---|---|
| 2008/0134202 A1* | 6/2008 | Craggs | G06F 9/542 719/313 |
| 2011/0093306 A1 | 4/2011 | Nielsen et al. | |
| 2011/0244949 A1* | 10/2011 | Gagner | G07F 17/32 463/25 |
| 2013/0046778 A1 | 2/2013 | Higgins et al. | |
| 2013/0130683 A1* | 5/2013 | Krukar | H04W 4/022 455/435.1 |
| 2014/0056224 A1* | 2/2014 | Rubin | H04W 28/021 370/328 |
| 2015/0032751 A1* | 1/2015 | Ting | G06F 17/30598 707/738 |

OTHER PUBLICATIONS

The Weather Channel, "Weather—The Weather Channel," https://play.google.com/store/apps/details?id=com. weather.Weather &hl=en, 2017, pp. 1-3.

Office Action for U.S. Appl. No. 14/486,581 dated Nov. 18, 2016, pp. 1-21.

Office Action for U.S. Appl. No. 14/486,581 dated Jun. 2, 2017, pp. 1-18.

* cited by examiner

DYNAMICALLY ROUTING MESSAGES IN A PUBLISH/SUBSCRIBE SYSTEM BY CREATING TEMPORAL TOPICS FOR SUBSCRIPTIONS AND PUBLICATIONS

TECHNICAL FIELD

The present invention relates to publish/subscribe systems, and more particularly to dynamically routing messages in a publish/subscribe system by creating temporal topics for subscriptions and publications.

BACKGROUND

A publish/subscribe system (or "publish-subscribe" system) is an effective way of disseminating information from "publishers" to multiple users or "subscribers." A publisher generates messages, also referred to as events, which contain a topic and some data content. A subscriber, also referred to as a "client," provides, ahead of time, a criterion, also referred to as a subscription, that specifies the information, based on published messages, that the system ("messaging system") is required to deliver to that subscriber client in the future. In a publish/subscribe system, publishers and subscribers are anonymous in that publishers do not necessarily know the number of subscribers or their locations; and subscribers do not necessarily know the locations of the publishers.

In the publish/subscribe system, subscribers typically receive only a subset of the total messages published. The messages may be selected for reception and processing using topic-based filtering. In a topic-based system, messages are published to "topics" or named logical channels. A topic may consist of multiple strings and wildcards. The publisher registers with a messaging application of the messaging system and defines the topics for the messages that will be published. For example, a publisher may publish messages pertaining to the soccer team of Manchester United (e.g., topic of "Sport/Soccer/ManchesterUnited"). A subscriber lists the topics of the messages (e.g., topic of "Sport/Soccer") the subscriber desires to receive ("subscription criterion"). The messages may be filtered by the messaging application using the subscription criterion which can be tested on each published message independent of any other message. For example, a filtered published message might be "topic=Sport/Soccer" for all messages related to the topic of soccer. As a result, the subscriber would receive messages published by the publisher pertaining to the soccer team of Manchester United.

Unfortunately, in the existing messaging systems, such topics are created statically. The topics are predefined and the messages are routed based on these predefined topics. As a result, important messages may not be effectively disseminated between the publishers and subscribers. For example, currently, there has been an increase in data being generated by sensors, mobile devices, etc. For instance, suppose a car accident was detected. The message pertaining to the car accident may be published to all the cars within a one mile radius of the car involved in the accident. However, since cars are moving and their geolocation coordinates are constantly changing, a static subscription and static publication system would not be able to inform those new drivers that are now within the one mile radius of the car accident after the initial publication of the message.

BRIEF SUMMARY

In one embodiment of the present invention, a method for dynamically routing messages in a publish/subscribe system comprises receiving one or more messages from one or more sensors. The method further comprises analyzing the one or more messages using data analytics. Furthermore, the method comprises correlating, by a processor, one or more of the one or more analyzed messages with an event. Additionally, the method comprises creating a temporal topic for targeted potential subscribers located within a geo-location area in response to the one or more of the one or more analyzed messages being correlated with the event. The method further comprises creating a temporal publication based on the event. The method additionally comprises creating a temporal subscription to subscribe to the created temporal topic. In addition, the method comprises associating subscribers to the temporal subscription that are located within the geo-location area. The method further comprises publishing the temporal publication to the subscribers associated with the temporal subscription.

Other forms of the embodiment of the method described above are in a system and in a computer program product.

In another embodiment of the present invention, a method for dynamically routing messages in a publish/subscribe system comprises receiving one or more messages from one or more sensors. The method further comprises analyzing the one or more messages using data analytics. The method additionally comprises correlating, by a processor, one or more of the one or more analyzed messages with an event. Furthermore, the method comprises creating a temporal topic in response to the one or more of the one or more analyzed messages being correlated with the event. Additionally, the method comprises creating a temporal publication based on the event. In addition, the method comprises creating a temporal subscription to subscribe to the created temporal topic. The method further comprises identifying subscribers based on social media to be associated with the temporal subscription. The method additionally comprises publishing the temporal publication to the subscribers associated with the temporal subscription.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for dynamically routing messages in a publish/subscribe system. In one embodiment of the present invention, a messaging application receives messages from one or more sensors (e.g., road condition sensors, driver activity sensors, geolocation sensors, weather information sensors). Upon analyzing the messages using data analytics, an event (e.g., a driving condition meeting an alert threshold, such as an icy road condition) may be correlated with the analyzed messages. In such a scenario, a temporal topic based on the triggered event is created. Furthermore, a temporal publication (e.g., "icy road condition near exit 40 on interstate 75") is created. Additionally, a temporal subscription is created. Potential subscribers to be associated with the temporal subscription are identified by using either geo-location information or social media information. Once those subscribers are identified, they are associated with the temporal subscription. The temporal publication is then published to the subscribers associated with the temporal subscription. In this manner, messages are dynamically routed to the appropriate subscribers that may have previously been excluded based on dynamically created temporal topics, subscriptions and publications.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
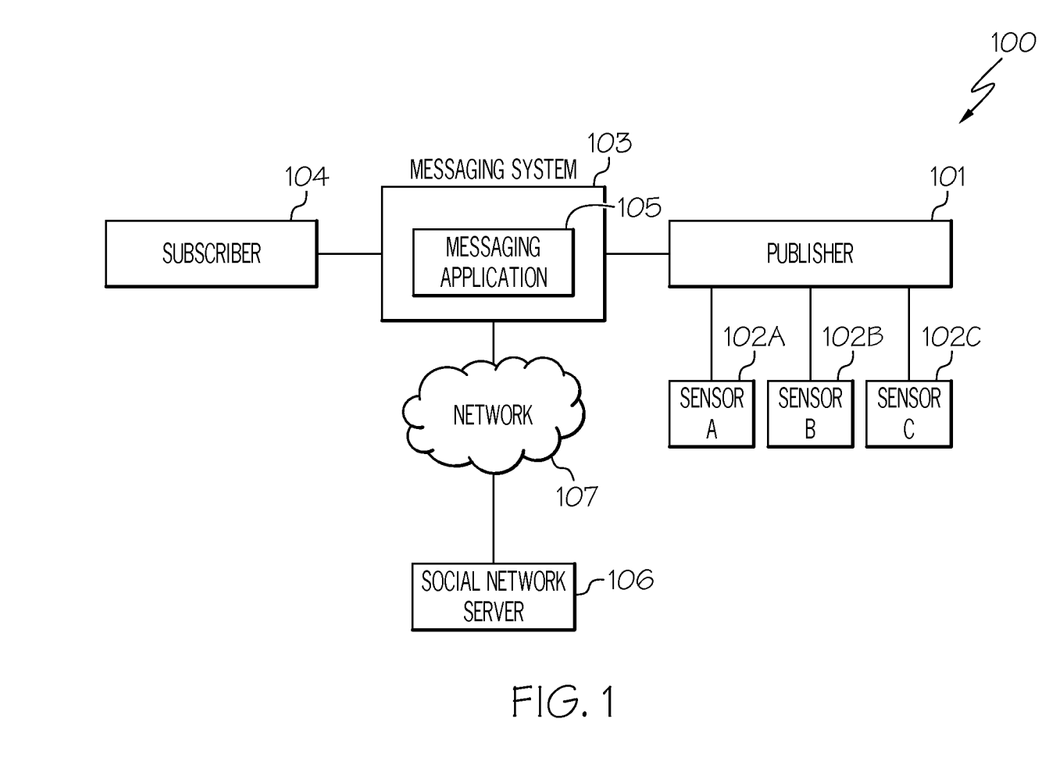
FIG. 1 illustrates a publish/subscribe system configured in accordance with an embodiment of the present invention.

Referring now to the Figures in detail, FIG. 1 illustrates a publish/subscribe system 100 for practicing the principles of the present invention in accordance with an embodiment of the present invention. Publish/subscribe system 100 includes a publisher 101 that generates messages, including temporal publications, which contain a topic and some data content. A "temporal publication," as used herein, refers to a publication that is only temporarily valid. Publisher 101 may be any type of computing device (e.g., automobile computing system, portable computing unit, personal digital assistant (PDA), smartphone, desktop computer system, workstation, Internet appliance and the like) configured with the capability of relaying messages received from sensors 102A-102C (e.g., road condition sensors, driver activity sensors, geolocation sensors, weather information sensors) to a messaging system 103 to be delivered to interested subscribers 104 (only one is shown in FIG. 1). Sensors 102A-102C may collectively or individually be referred to as sensors 102 or sensor 102, respectively. In one embodiment, sensors 102 may be integrated with publisher 101 (e.g., automobile computing system). For example, in the context where publisher 101 is an automobile computing system, sensors 102 generating information, such as biometrics, road condition, driver activity, weather information and geolocation, may reside within the automobile and integrated with the automobile computing system. The information generated by sensors 102 may then be relayed to messaging system 103 by publisher 101. In another embodiment, sensors 102 may not be directly integrated with publisher 101 and may communicate with publisher 101 (e.g., smartphone) via a network (e.g., wireless network). For example, in the context where publisher 101 is a smartphone (e.g., the smartphone of the driver of an automobile), sensors 102 generating information, such as the road condition, may reside within the automobile and communicate such information to the smartphone, such as via a wireless network. Such information may then be relayed to messaging system 103 by publisher 101. While FIG. 1 illustrates three sensors 102, publish/subscribe system 100 may include any number of sensors 102 used to generate messages that are routed to messaging system 103 that can be used to trigger events as discussed further below.

Messaging system 103 acts as an intermediary between publisher 101 and individual subscribers 104 (also referred to herein as "clients"). A subscriber 104 may be any type of computing device (e.g., automobile computing system, portable computing unit, personal digital assistant (PDA), smartphone, desktop computer system, workstation, Internet appliance and the like) configured with the capability of receiving messages from messaging system 103.

As will be discussed in further detail below, a messaging application 105 of messaging system 103 dynamically creates temporal publications, temporal subscriptions and temporal topics. A "temporal subscription," refers to a subscription that is temporarily valid. Furthermore, a "temporal topic," refers to a topic that is temporarily valid. Messaging application 105 dynamically creates a temporal topic (e.g., "/car/safetyalerts/icyroads/geolocations/geolocation=polygon1") based on a triggered event (e.g., car accident, icy road condition). A temporal publication (e.g., "icy road condition near exit 40 on interstate 75") and a temporal subscription (e.g., "/car/safetyalerts/geolocation/geolocation=current_coordinates") are further created based on the created temporal topic. Messaging system 103 delivers these temporal publications to subscribers 104 that are identified as being interested in receiving the temporal publications. Such subscribers 104 may be identified based on geolocation information or social media. A more detailed description of the hardware configuration of messaging system 103 is provided below in connection with FIG. 2.

In one embodiment, messaging application 105 identifies potential subscribers to be associated with the temporal subscription based on geolocation information. For example, if the triggered event corresponded to a car accident, then potential subscribers may be identified by projecting a polygon over a geographical area around the vehicle(s) involved in the car accident thereby identifying automobiles (automobile computing systems) within the polygon (e.g., a mile from the car accident) that would potentially be interested in receiving a message pertaining to the car accident.

In another embodiment, messaging application 105 identifies potential subscribers to be associated with the temporal subscription based on social media (e.g., social media websites, such as Facebook®). In one embodiment, messaging application 105 is configured to monitor information from at least one social media source (e.g., postings, instant messages, repostings, a profile, such as a profile on Facebook®). In one embodiment, messaging application 105 utilizes natural language processing in understanding the information found on social media websites, such as the postings on a user's profile. For example, messaging application 105 may identify the location of a potential subscriber based on the user's profile indicating that the user is currently at a particular location. Such information may be utilized by messaging application 105 to determine whether such a user would be interested in receiving a message (e.g., icy road condition) based on the user's current location. In another example, messaging application 105 may determine from a user's profile that the user is planning to travel on a route where an automobile accident has been detected. Such information may be utilized by messaging application 105 to determine whether such a user would be interested in receiving a message (e.g., icy road condition) based on the user's travel plans.

In connection with the embodiment of messaging application 105 identifying potential subscribers to be associated with the temporal subscription based on social media, publish/subscribe system 100 further includes a social network server 106, which may be a web server configured to offer a social networking and/or microblogging service, connected to messaging system 103 via a network 107. Network 107 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates a single publisher 101, a single messaging system 103, a single subscriber 104 and a single social network server 106, publish/subscribe system 100 may include any number of publishers 101, messaging systems 103, subscribers 104 and social network servers 106. Furthermore, publish/subscribe system 100 is not to be limited in scope to any one particular architecture. For example, messaging system 103 may reside within subscriber 104 or publisher 101. Furthermore, subscriber 104, messaging system 103 and publisher 101 may all be interconnected via a network (not shown), such as a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc.

Figure 2:
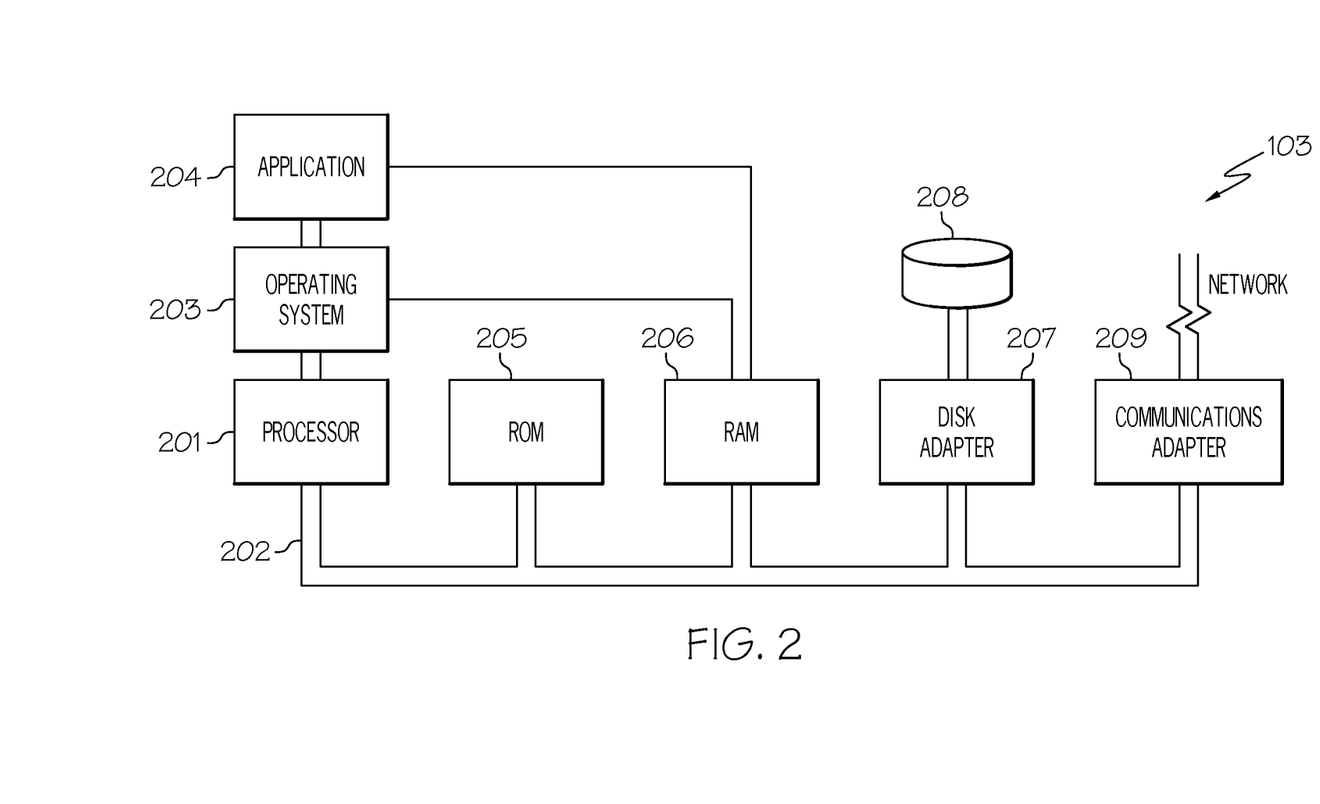
FIG. 2 illustrates a hardware configuration of a messaging system in accordance with an embodiment of the present invention.

Referring now to FIG. 2, FIG. 2 illustrates a hardware configuration of messaging system 103 (FIG. 1) which is representative of a hardware environment for practicing the present invention. Referring to FIG. 2, messaging system 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, messaging application 105 (FIG. 1) configured to dynamically route messages in publish/subscribe system 100 (FIG. 1) by creating temporal topics for subscriptions and publications as discussed further below in association with FIGS. 3-4.

Referring again to FIG. 2, read-only memory ("ROM") 205 is coupled to system bus 202 and includes a basic input/output system ("BIOS") that controls certain basic functions of messaging system 103. Random access memory ("RAM") 206 and disk adapter 207 are also coupled to system bus 202. It should be noted that software components including operating system 203 and application 204 may be loaded into RAM 206, which may be messaging system's 103 main memory for execution. Disk adapter 207 may be an integrated drive electronics ("IDE") adapter that communicates with a disk unit 208, e.g., disk drive.

Messaging system 103 may further include a communications adapter 209 coupled to bus 202. Communications adapter 209 interconnects bus 202 with an outside network thereby enabling messaging system 103 to communicate with publisher 101, subscriber 104 and social network server 106.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in a publish/subscribe system, subscribers typically receive only a subset of the total messages published. The messages may be selected for reception and processing using topic-based filtering. In a topic-based system, messages are published to "topics" or named logical channels. A topic may consist of multiple strings and wildcards. The publisher registers with a messaging application of the messaging system and defines the topics for the messages that will be published. A subscriber lists the topics of the messages the subscriber desires to receive ("subscription criterion"). The messages may be filtered by the messaging application using the subscription criterion which can be tested on each published message independent of any other message. Unfortunately, in the existing messaging systems, such topics are created statically. The topics are predefined and the messages are routed based on these predefined topics. As a result, important messages may not be effectively disseminated between the publishers and subscribers. For example, currently, there has been an increase in data being generated by sensors, mobile devices, etc. For instance, suppose a car accident was detected. The message pertaining to the car accident may be published to all the cars within a one mile radius of the car involved in the accident. However, since cars are moving and their geolocation coordinates are constantly changing, a static subscription and static publication system would not be able to inform those new drivers that are now within the one mile radius of the car accident after the initial publication of the message.

Figure 3:
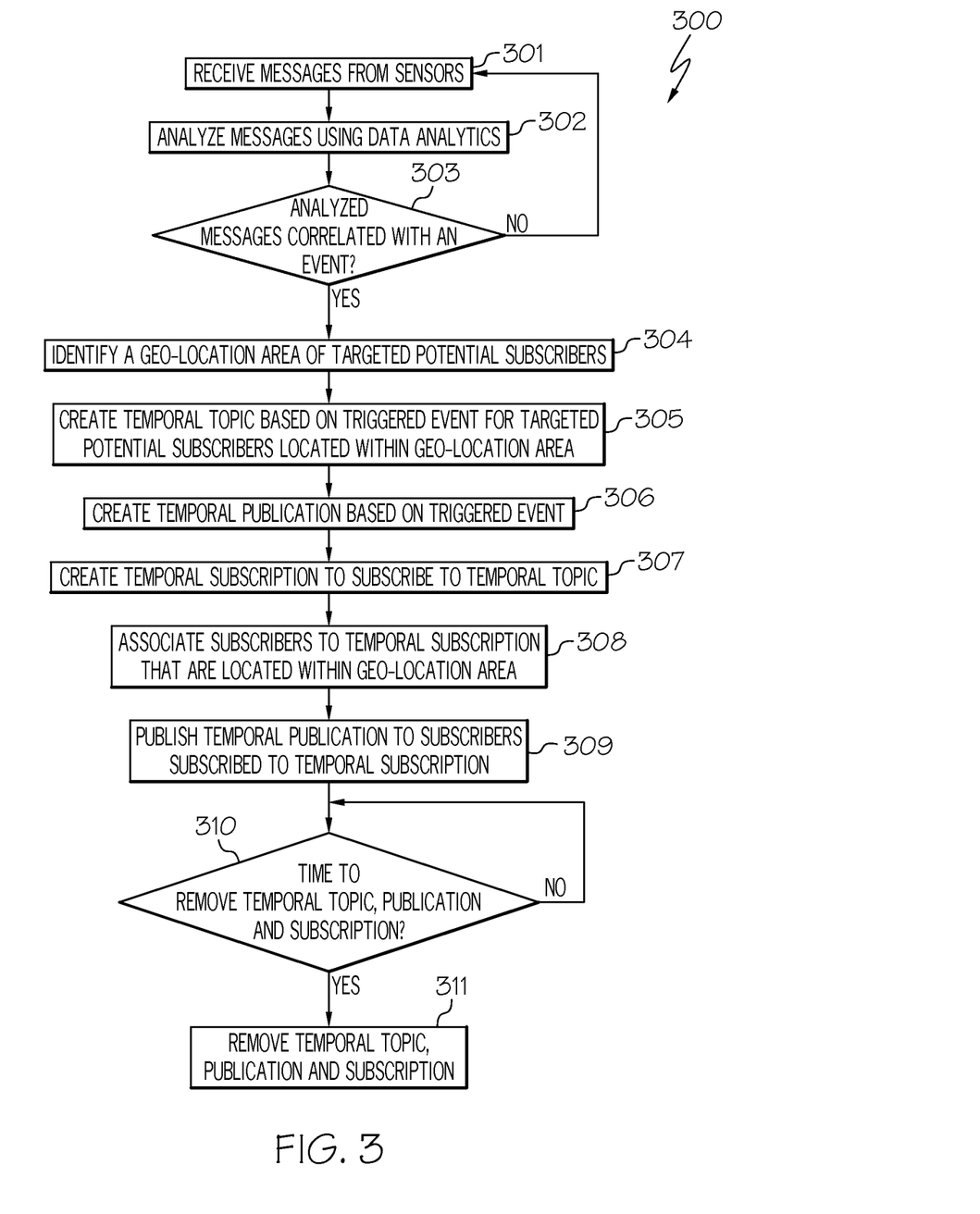
FIG. 3 is a flowchart of a method for dynamically routing messages in the publish/subscribe system in accordance with an embodiment of the present invention.
Figure 4:
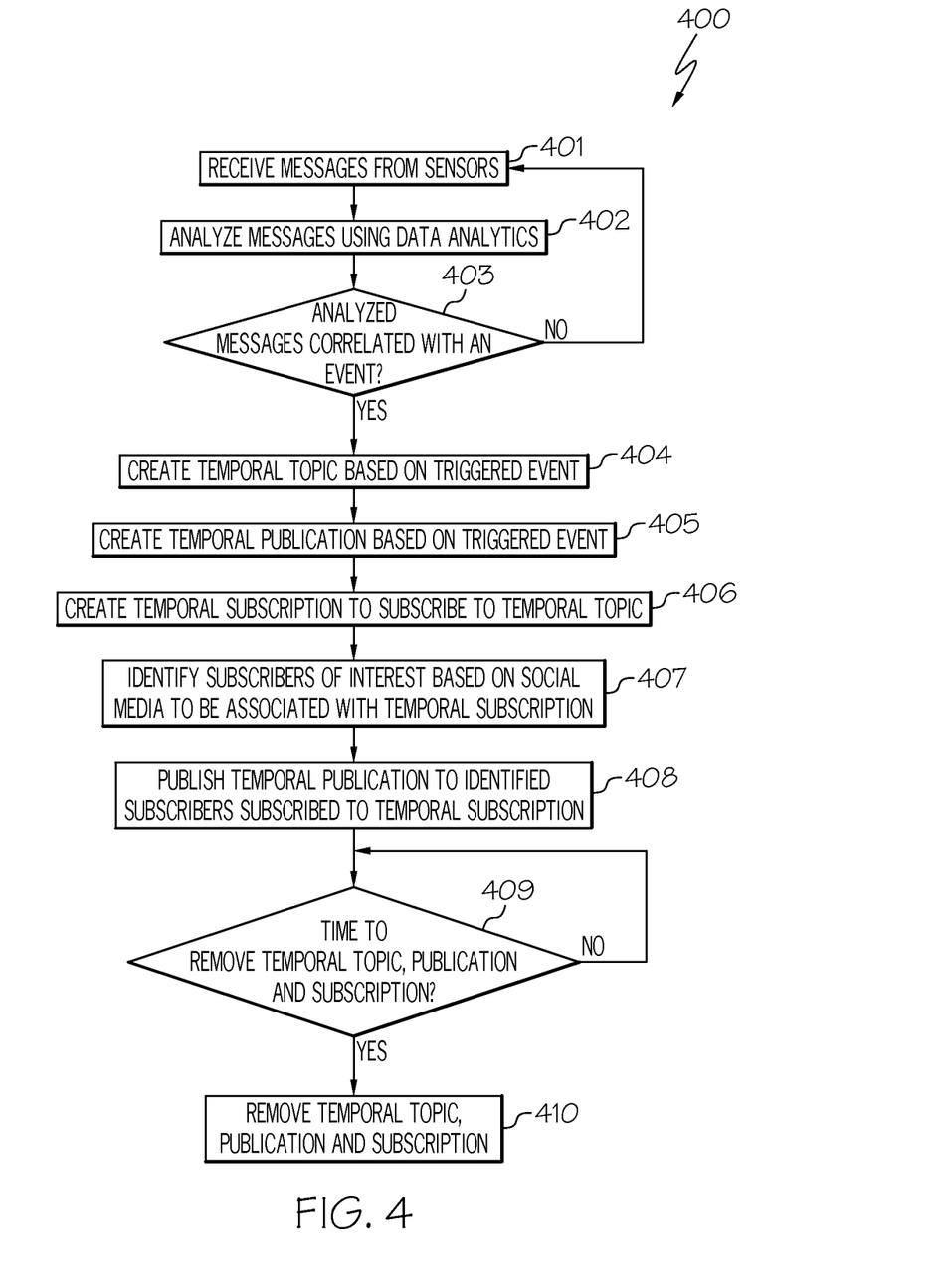
FIG. 4 is a flowchart of an alternative method for dynamically routing messages in the publish/subscribe system in accordance with an embodiment of the present invention.

The principles of the present invention provide a means for dynamically creating temporal topics based on events correlated with the messages received from sensors (e.g., sensors 102 of FIG. 1) thereby creating temporal publications and temporal subscriptions to dynamically route messages based on these events in publish/subscribe system 100 (FIG. 1) as discussed further below in association with FIGS. 3-4. FIG. 3 is a flowchart of a method for dynamically routing messages in publish/subscribe system 100. FIG. 4 is a flowchart of an alternative method for dynamically routing messages in publish/subscribe system 100.

As stated above, FIG. 3 is a flowchart of a method 300 for dynamically routing messages in publish/subscribe system 100 in accordance with an embodiment of the present invention.

Referring to FIG. 3, in conjunction with FIGS. 1-2, in step 301, messaging application 105 receives messages from sensors 102 (e.g., road condition sensors, driver activity sensors, geolocation sensors, weather information sensors). For example, sensors 102 may reside within an automobile and generate information, such as biometrics, road condition, driver activity, weather information and geolocation. The information generated by sensors 102 is provided to publisher 101 (e.g., automobile computing system, smartphone) which is routed to messaging system 103.

In step 302, messaging application 105 analyzes the messages using data analytics. For example, data analytics may involve the use of natural language processing, text analysis and computational linguistics to identify and extract information from these messages.

In step 303, a determination is made by messaging application 105 as to whether an event (e.g., a driving condition meeting an alert threshold) is correlated with the analyzed messages. For example, messaging application 105 may receive messages pertaining to a road condition, such as slippery road condition, as well as pertaining to the weather, such as the temperature being below freezing. Based on analyzing these messages, messaging application 105 may determine that an event, such as an icy road condition, is correlated with the analyzed messages.

If an event is not correlated with the analyzed messages, then messaging application 105 continues to receive messages from sensors 102 in step 301.

If, however, an event is correlated with the analyzed messages, then, in step 304, messaging application 105 identifies a geo-location area of targeted potential subscribers, such as by projecting a polygon over the geo-location area. For example, if the event correlated with the analyzed messages corresponded to a car accident, then a geographical area of potential subscribers is identified by projecting a polygon over a geographical area around the vehicle(s) involved in the car accident thereby identifying automobiles (automobile computing systems) within the polygon (e.g., a mile from the car accident) that would potentially be interested in receiving a message pertaining to the car accident.

In step 305, messaging application 105 creates a temporal topic based on the triggered event for targeted potential subscribers (e.g. automobile computing systems) located within the geo-location area. For example, in response to detecting an icy road condition event, the temporal topic of "/car/safetyalerts/icyroads/geolocations/geolocation=polygon1" is dynamically created over a geo-location area, such as the area covered by a polygon (e.g., polygon 1) projected over that area.

In step 306, messaging application 105 creates a temporal publication based on the triggered event. For example, a temporal publication of "icy road condition near exit 40 on interstate 75" is created in response to detecting an icy road condition event.

In step 307, messaging application 105 creates a temporal subscription to subscribe to the created temporal topic. For example, a temporal subscription of "/car/safetyalerts/geo-location/geolocation=current_coordinates" is created in response to detecting an icy road condition event.

In step 308, messaging application 105 associates subscribers 104 (e.g., automobile computing systems, mobile devices, smartphones) to the temporal subscription that are located within the geo-location area identified in step 304.

In step 309, messaging application 105 publishes the temporal publication to the subscribers 104 associated with the temporal subscription. In this manner, messages are dynamically routed to the appropriate subscribers that may have previously been excluded based on dynamically created temporal topics, subscriptions and publications.

In step 310, a determination is made by messaging application 105 as to whether it is time to remove the temporal topics, subscriptions and publications. The topics, subscriptions and publications that are created by messaging application 105 are temporal in nature and are valid for a certain duration of time. Once that period of time has elapsed, messaging application 105 removes the temporal topics, subscriptions and publications.

If it is not time to remove the temporal topics, subscriptions and publications (i.e., the period of time that temporal topics, subscriptions and publications are valid has not yet elapsed), then messaging application 105 continues to determine whether it is time to remove the temporal topics, subscriptions and publications in step 310.

If, however, it is time to remove the temporal topics, subscriptions and publications (i.e., the period of time that temporal topics, subscriptions and publications are valid has elapsed), then, in step 311, messaging application 105 removes the temporal topics, subscriptions and publications.

An alternative method for dynamically routing messages in publish/subscribe system 100 by identifying potential subscribers through the use of social media is discussed below in connection with FIG. 4.

FIG. 4 is a flowchart of an alternative method 400 for dynamically routing messages in publish/subscribe system 100 in accordance with an embodiment of the present invention.

Referring to FIG. 4, in conjunction with FIGS. 1-2, in step 401, messaging application 105 receives messages from sensors 102 (e.g., road condition sensors, driver activity sensors, geolocation sensors, weather information sensors). For example, sensors 102 may reside within an automobile and generate information, such as biometrics, road condition, driver activity, weather information and geolocation. The information generated by sensors 102 is provided to publisher 101 (e.g., automobile computing system, smartphone) which is routed to messaging system 103.

In step 402, messaging application 105 analyzes the messages using data analytics. For example, data analytics may involve the use of natural language processing, text analysis and computational linguistics to identify and extract information from these messages.

In step 403, a determination is made by messaging application 105 as to whether an event (e.g., a driving condition meeting an alert threshold) is correlated with the analyzed messages. For example, messaging application 105 may receive messages pertaining to a road condition, such as slippery road condition, as well as pertaining to the weather, such as the temperature being below freezing. Based on analyzing these messages, messaging application 105 may determine that an event, such as an icy road condition, is correlated with the analyzed messages.

If an event is not correlated with the analyzed messages, then messaging application 105 continues to receive messages from sensors 102 in step 401.

If, however, an event is correlated with the analyzed messages, then, in step 404, messaging application 105 creates a temporal topic based on the triggered event. For example, in response to detecting an icy road condition event, the temporal topic of "/car/safetyalerts/icyroads/geo-locations/geolocation=polygon1" is dynamically created.

In step 405, messaging application 105 creates a temporal publication based on the triggered event. For example, a temporal publication of "icy road condition near exit 40 on interstate 75" is created in response to detecting an icy road condition event.

In step 406, messaging application 105 creates a temporal subscription to subscribe to the created temporal topic. For example, a temporal subscription of "/car/safetyalerts/geo-location/geolocation=current_coordinates" is created in response to detecting an icy road condition event.

In step 407, messaging application 105 identifies subscribers of interest 104 based on social media to be associated with the temporal subscription. For example, messaging application 105 may be configured to search social networking websites (e.g., profiles on Facebook®) to identify the location of a potential subscriber based on the user's profile (e.g., profile indicates the current location of the user, profile indicates the user's travel plans) utilizing natural language processing. If it is deemed that the user would be interested in receiving information pertaining to the triggered event (e.g., icy road condition) based on the user's current location or travel plans, then the user's computing device (e.g., smartphone, automobile computing system) would be identified as a subscriber of interest 104 to be associated with the temporal subscription. It is noted for clarity that such users did not previously register such a topic of interest (e.g., icy road condition) with messaging application 105 and that such users are dynamically identified based on the triggered events and the information gathered from social media at that point in time. In one embodiment, the user's computing device would be identified based on information obtained from the user's profile.

In step 408, messaging application 105 publishes the temporal publication to the subscribers 104 associated with the temporal subscription. In this manner, messages are dynamically routed to the appropriate subscribers that may have previously been excluded based on dynamically created temporal topics, subscriptions and publications.

In step 409, a determination is made by messaging application 105 as to whether it is time to remove the temporal topics, subscriptions and publications. The topics, subscriptions and publications that are created by messaging application 105 are temporal in nature and are valid for a certain duration of time. Once that period of time has elapsed, messaging application 105 removes the temporal topics, subscriptions and publications.

If it is not time to remove the temporal topics, subscriptions and publications (i.e., the period of time that temporal topics, subscriptions and publications are valid has not yet elapsed), then messaging application 105 continues to determine whether it is time to remove the temporal topics, subscriptions and publications in step 409.

If, however, it is time to remove the temporal topics, subscriptions and publications (i.e., the period of time that temporal topics, subscriptions and publications are valid has elapsed), then, in step 410, messaging application 105 removes the temporal topics, subscriptions and publications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for dynamically routing messages in a publish-subscribe system, the computer program product comprising a computer readable storage medium having program code embodied therewith, the program code comprising the programming instructions for:
receiving one or more messages from one or more sensors;
analyzing said one or more messages using data analytics;
correlating one or more of said one or more analyzed messages with an event;
creating a temporal topic over a geo-location area for targeted potential subscribers in response to said one or more of said one or more analyzed messages being correlated with an event;
creating a temporal publication based on said event;
creating a temporal subscription to subscribe to said created temporal topic;
associating subscribers to said temporal subscription that are located within said geo-location area; and
publishing said temporal publication to said subscribers associated with said temporal subscription.

2. The computer program product as recited in claim 1, wherein the program code further comprises the programming instructions for:
projecting a polygon over said geo-location area of said targeted potential subscribers.

3. The computer program product as recited in claim 1, wherein said event corresponds to a driving condition meeting an alert threshold.

4. The computer program product as recited in claim 1, wherein said one or more messages received from said one or more sensors comprises one or more of the following: biometric, road conditions, driver activity, weather information and geolocation.

5. The computer program product as recited in claim 1, wherein said one or more sensors reside within an automobile.

6. The computer program product as recited in claim 1, wherein the program code further comprises the programming instructions for:
removing said temporal topic, said temporal publication and said temporal subscription after a period of time has elapsed.

7. A system, comprising:
a memory unit for storing a computer program for dynamically routing messages in a publish-subscribe system; and
a processor coupled to the memory unit, wherein the processor is configured to execute the program instructions of the computer program comprising:
receiving one or more messages from one or more sensors;
analyzing said one or more messages using data analytics;
correlating one or more of said one or more analyzed messages with an event;
creating a temporal topic over a geo-location area for targeted potential subscribers in response to said one or more of said one or more analyzed messages being correlated with an event;
creating a temporal publication based on said event;
creating a temporal subscription to subscribe to said created temporal topic;
associating subscribers to said temporal subscription that are located within said geo-location area; and
publishing said temporal publication to said subscribers associated with said temporal subscription.

8. The system as recited in claim 7, wherein the program instructions of the computer program further comprises:
projecting a polygon over said geo-location area of said targeted potential subscribers.

9. The system as recited in claim 7, wherein said event corresponds to a driving condition meeting an alert threshold.

10. The system as recited in claim 7, wherein said one or more messages received from said one or more sensors comprises one or more of the following: biometric, road conditions, driver activity, weather information and geolocation.

11. The system as recited in claim 7, wherein said one or more sensors reside within an automobile.

12. The system as recited in claim 7, wherein the program instructions of the computer program further comprises:
removing said temporal topic, said temporal publication and said temporal subscription after a period of time has elapsed.

13. A computer program product for dynamically routing messages in a publish-subscribe system, the computer program product comprising a computer readable storage medium having program code embodied therewith, the program code comprising the programming instructions for:

receiving one or more messages from one or more sensors;

analyzing said one or more messages using data analytics;

correlating one or more of said one or more analyzed messages with an event;

creating a temporal topic in response to said one or more of said one or more analyzed messages being correlated with said event;

creating a temporal publication based on said event;

creating a temporal subscription to subscribe to said created temporal topic;

identifying subscribers based on social media to be associated with said temporal subscription; and publishing said temporal publication to said subscribers associated with said temporal subscription.

14. The computer program product as recited in claim 13, wherein said subscribers are identified to be associated with said temporal subscription based on said social media using natural language processing.

15. The computer program product as recited in claim 13, wherein said event corresponds to a topic of interest to said subscribers that are identified to be associated with said temporal subscription, wherein said subscribers that are identified to be associated with said temporal subscription did not previously register said topic of interest with a messaging application to receive messages related to said topic of interest.

16. The computer program product as recited in claim 13, wherein said one or more messages received from said one or more sensors comprises one or more of the following: biometric, road conditions, driver activity, weather information and geolocation.

17. The computer program product as recited in claim 13, wherein said one or more sensors reside within an automobile.

18. The computer program product as recited in claim 13, wherein the program code further comprises the programming instructions for:

removing said temporal topic, said temporal publication and said temporal subscription after a period of time has elapsed.

* * * * *